United States Patent [19]
Yajima et al.

[11] Patent Number: 5,331,545
[45] Date of Patent: Jul. 19, 1994

[54] SYSTEM AND METHOD FOR PLANNING SUPPORT

[75] Inventors: Hiroshi Yajima, Yokohama; Hideaki Shinohara, Nakatado; Shoichi Masui, Kawasaki; Hiroshi Sugimoto, Oosaka, all of Japan

[73] Assignee: Hitachi, Ltd., Tokyo, Japan

[21] Appl. No.: 907,403

[22] Filed: Jul. 1, 1992

[30] Foreign Application Priority Data

Jul. 5, 1991 [JP] Japan .................. 3-165523

[51] Int. Cl.$^5$ .................. G06F 15/22; G06G 7/52
[52] U.S. Cl. .................. 364/401; 364/402; 364/468
[58] Field of Search .................. 364/468, 401, 402

Primary Examiner—Roy N. Envall, Jr.
Assistant Examiner—Ari M. Bai
Attorney, Agent, or Firm—Fay, Sharpe, Beall, Fagan, Minnich & McKee

[57] ABSTRACT

A planning support system and process in a workstation having an operator interface, planning process feature, a data file server, and memory feature therein, characterized in storing a planner model having data indicating a plurality of planning actions in the data file server and indicating flow among the planning actions and having process times of the planning actions, and in processes executed by the planning process feature including setting an operator model on the basis of a planning request input through the operator interface, and including determining action of a first planning action to be executed according to the planner model on the basis of the operator model and for determining a second planning action to be executed following the first planning action, and including storing data needed for process of the second planning action into the memory feature until the process of the second planning action is started after process of the first planning action ends on the basis of the planner model. Parts of a model of the planning work usually made by man can be carried out by computer, and necessary data can be predicted according to process of the planning work of the planner to prepare in advance. This makes it possible that data supply time for the planner is made at a pace of his or her working process.

9 Claims, 14 Drawing Sheets

FIG. 10

| OBJECT NODE NAME 1201 | DESTINATION NODE NAME 1202 | WEIGHT PER EACH DESTINATION 1203 | NECESSARY STORING TIME 1204 | PROCESSING TIME 1205 |
|---|---|---|---|---|
| PLANNING ACTION 1 | PLANNING ACTION 2<br>PLANNING ACTION 3 | 1<br>3 | 5 | 1 |
| PLANNING ACTION 2 | PLANNING ACTION 4 | 2 | 6 | 3 |
| PLANNING ACTION 3 | PLANNING ACTION 5<br>PLANNING ACTION 6 | 1<br>4 | 2 | 2 |
| PLANNING ACTION 4 | PLANNING ACTION 1 | 2 | 3 | 1 |
| PLANNING ACTION 5 | PLANNING ACTION 7<br>PLANNING ACTION 8 | 5<br>1 | 6 | 8 |
| PLANNING ACTION 6 | PLANNING ACTION 7 | 3 | 5 | 1 |
| PLANNING ACTION 7 | | | 2 | 2 |
| PLANNING ACTION 8 | PLANNING ACTION 3 | 1 | 4 | 10 |

FIG. 13

| OBJECT NODE NAME | DESTINATION NODE NAME | TIME OF EXECUTION |
|---|---|---|
| PLANNING ACTION 1 | PLANNING ACTION 2<br>PLANNING ACTION 3 | 4<br>6 |
| PLANNING ACTION 2 | PLANNING ACTION 4 | 4 |
| PLANNING ACTION 3 | PLANNING ACTION 5<br>PLANNING ACTION 6 | 4<br>8 |
| PLANNING ACTION 4 | PLANNING ACTION 8 | 4 |
| PLANNING ACTION 7 | PLANNING ACTION 8 | 2 |
| PLANNING ACTION 8 | PLANNING ACTION 3 | 6 |
| -- | PLANNING ACTION 1 | 10 |
| -- | PLANNING ACTION 7 | 2 |

| OBJECT NODE NAME | DESTINATION NODE NAME | WEIGHT PER EACH DESTINATION | PROBABILITY PER EACH ROUTE | NECESSARY STORING TIME | PROCESSING TIME |
|---|---|---|---|---|---|
| 1601 | 1602 | 1603 | 1604 | 1605 | 1606 |
| PLANNING ACTION 1 | PLANNING ACTION 2<br>PLANNING ACTION 3 | 1<br>3 | 0.4<br>0.6 | 5 | 1 |
| PLANNING ACTION 2 | PLANNING ACTION 4 | 2 | 1.0 | 6 | 3 |
| PLANNING ACTION 3 | PLANNING ACTION 5<br>PLANNING ACTION 6 | 1<br>4 | 0.33<br>0.66 | 2 | 2 |
| PLANNING ACTION 4 | PLANNING ACTION 8 | 2 | 1.0 | 3 | 1 |
| PLANNING ACTION 7 | PLANNING ACTION 8 | 1 | 1.0 | 2 | 2 |
| PLANNING ACTION 8 | PLANNING ACTION 6 | 1 | 1.0 | 4 | 10 |

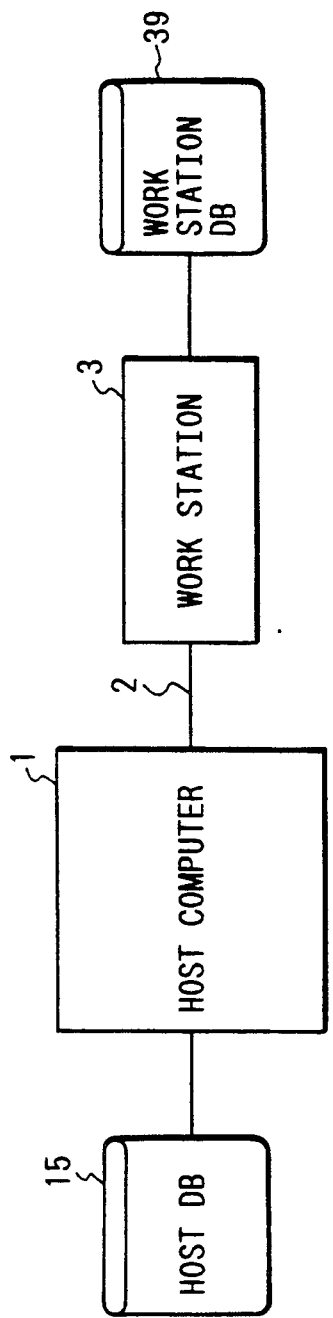

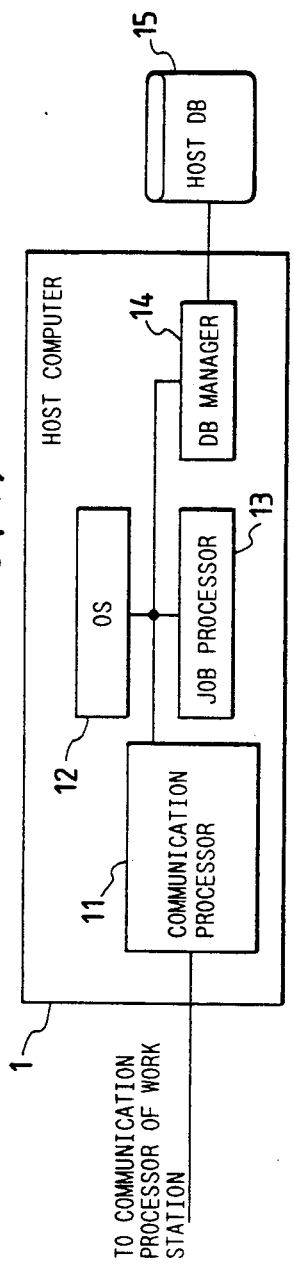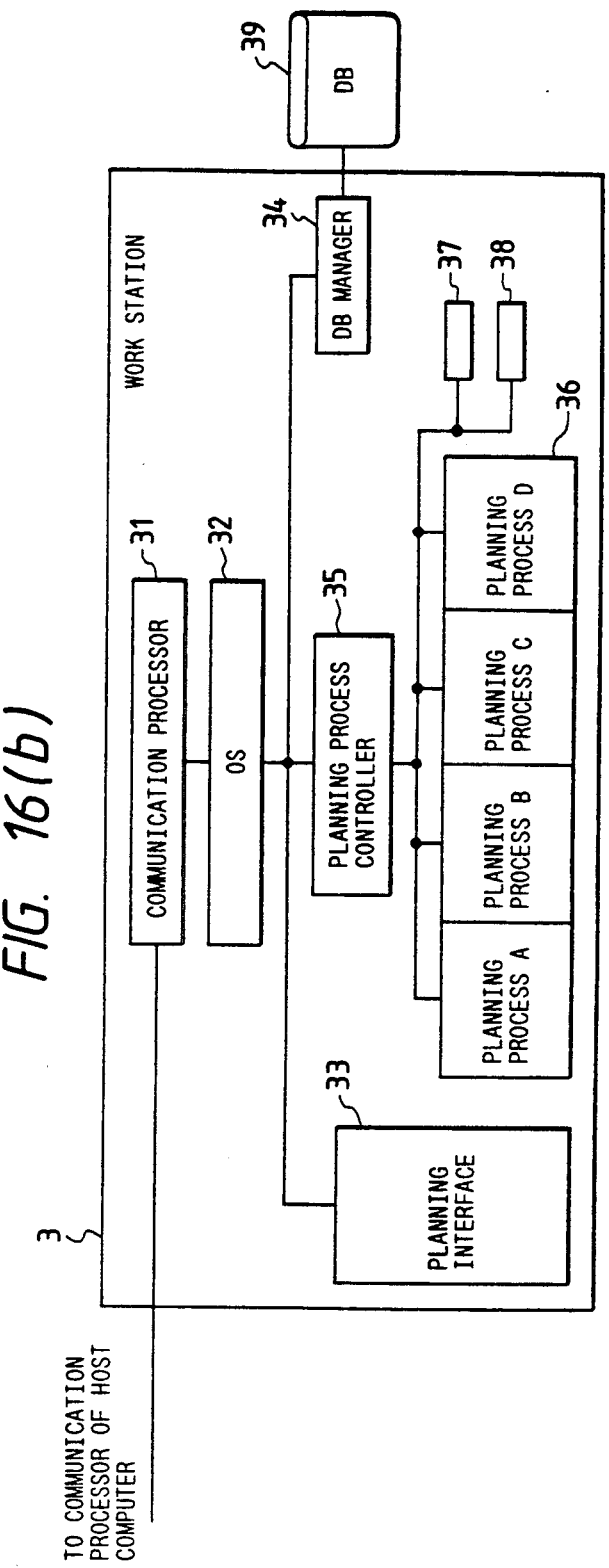
FIG. 16(a)
FIG. 16(b)

SYSTEM AND METHOD FOR PLANNING SUPPORT

BACKGROUND OF THE INVENTION

1. Field of the Invention

The present invention relates to a system and method for planning support for decision making in planning and analyzed works. More particularly, the present invention relates to a planning support system and process for accomplishing an intelligent data managing method in a support system for quick planning, such as scheduling and designing, with use of variety of data.

2. Description of the Prior Art

In order to allow for drastic changes of consumers' needs in recent years, it is necessary to quickly plan new products. For the purpose, computers are requested to support the planning and analyzing works. The system for use in such a purpose is called a strategic information system. The strategic information system aims at comprehensive use o the computer in the planning and analyzing works, while conventional computer systems are to chiefly attain higher efficiency as a basic information system.

It could be asserted that using the computers in the planning and analyzing works is backed by the following factors.

(1) The planning and analyzing works have been made more important to allow for the age of individualism. It is needed to adequately process an enormous amount of information generated by the basic information system built up so far.

(2) The environments where enterprises are placed have experienced greater changes. As we cannot expect to optimize a whole system, it is problematic to make the system satisfiable. For this reason, it is difficult to uniquely define any plan in a simple view that the plan can be made up or not. For example, it is occasionally needed to use a way of multi-level evaluation at the time of planning that can keep a least necessary evaluation index, depending on the situation of a process system, as all the conditions cannot be satisfied in preparing the plan. This leads to a problem of how to define plan evaluation of any system when the situations of the evaluation indexes and the operating methods corresponding to them are specified at several levels. That is, it is a relaxation problem of restrictive conditions.

(3) The situations where the system is in place are changing drastically corresponding to quick variations of events in the bustling world. For the planning in such difficult situations as experts have not experienced, designers have low confidence in planning guides and rules without a rational method to obtain a satisfying solution. For this reason, it is necessary to use a trial and error approach. This however has the disadvantage that it takes an excessive amount of time.

Support by computer for planning and analysis involves a problem that man and computer are to share the role. In particular, the support by computer is needed for effective use of human resources so that a brilliant planner can smoothly carry on his or her work. For the purpose, the computer has to proceed at a pace of man's working process.

However, no conventional computer systems have such a deliberation For this, the planner is often compelled to wait for his or her process for long time in front of the computer, particularly in a planning and analyzing that has to deal with enormous amount of data, such as point-of-sales (POS) data, and the data which are not made in forms.

To overcome such a difficult situation, the computer has been usually made to have higher speed, or graded up. To process enormous amount of data in a few seconds, it has the disadvantage that a high-speed computer has to be used. It also has the disadvantage that its cost performance is low. There has been demand of making improvement of the process in view of the cost performance of the computer.

In order to reduce memory capacity with computation speed being kept, a large scale computer has usually employed cache memory. The cache memory practice is desirable basically for processing of such kind of data (conventional data) which is known after a calculation task, namely a formatted data. However, it has the disadvantage that it is less effective for the system that has to process non-formatted data which are not known to come next.

The following describes the problems pointed out above in detail referring to FIG. 15 which shows a hardware configuration for a conventional planning support system. As an example, data necessary for the planning which is made by a planner with use of a workstation 3 WS exist in a database (hereinafter referred to as the DB) a host computer. Let a planning program be in the workstation 3 as an example.

In FIG. 15 are indicated the host computer 1, a communication line 2, the workstation 3, the host DB 15, and a workstation DB 39.

The planner enters a data input request into the workstation 3 in his or her planning work. The workstation 3 in turn gives the data input request through the communication line 2 to the host computer 1. The host computer 1 in turn transmits the data concerned from the host DB 15 to the workstation 3. The workstation 3 in turn stores the data fed into the workstation DB 39 and after this, sends them to the planner.

FIG. 16 is a software configurations for use in the host computer 1 and the workstation 3 in the conventional planning support system. In FIG. 16(a), the host computer 1 has a communication processor 11, an operating system OS 12, a job processor 13, and a DB manager 14 provided therein. In FIG. 16(b) is indicated a communication processor 31. In the figure, also, the workstation 3 has an operating system OS 32 therefor, a planning interface 33, a DB manager 34, a planning process controller 35, planning processes 36, an input processor 37, and a planning memory 38 therein.

In the planning work, the planner enters the data input request with use of functions of the planning interface 33 of the workstation 3. The planning interface 33 in turn transfers the request to the planning process controller 35. The planning process controller 35 starts the input processor 37 before giving the data input request to the host computer 1 through communication processor 31. On the other hand, the host computer 1 transfers the request to the operating system OS 12 when the communication processor 11 receives it from the workstation 3. The operating system OS 12 in turn starts the DB manager 14 before taking the data concerned from the host DB 15. The operating system OS 12 then sends the data to the workstation 3 through the communication processor 11.

In the workstation 3, the operating system OS 32 receives the data through the communication processor 31 before sending them to the DB manager 34. The DB manager 34 in turn stores the data sent in the workstation DB 39 and after this, returns them to the planning interface 33. The planner processes the data stored in the workstation DB 39 with use of a process program of the planning processes 36 if necessary. He or she then displays the results through the planning interface 33 and if the results are desirable, stores them in the planning memory 38 before ending the process.

As described in detail, the conventional planning support system is to force the human job to work at its pace. For this reason, the planner is often compelled to wait for his or her process for a long time in front of the computer.

SUMMARY OF THE INVENTION

In view of the foregoing, it is a general object of the present invention to provide a system and method for planning support, supporting planning and analyzing works to be smooth. The object is accomplished in a way that parts of a model of the planning work usually made by man can be carried out by computer, and necessary data can be predicted according to process of the planning work of the planner to prepare in advance. This makes it possible that data supply time for the planner is made at a pace of his or her working process.

Briefly, the foregoing object is accomplished in accordance with aspects of the present invention by the planning support system and process in a workstation having an operator interface, planning process function, a data file server, and memory function therein, characterized in storing a planner model having data indicating a plurality of planning actions in the data file server and indicating flow among the planning actions and having process times of the planning actions, and in processes executed by the planning process function including setting an operator model on the basis of a planning request input through the operator interface, and in determining a first planning action to be executed according to the planner model on the basis of the operator model and for determining a second planning action to be executed following the first planning action, and including storing data needed for process of the second planning action into the memory function before the process of the second planning action is started after process of the first planning action ends on the basis of the planner model.

In operation, the present invention can be outlined as follows. The planning support system of the present invention looks at an operator (planner) model when receiving input from an operator who is in charge of planning and analysis. It selects the next planning action of the planner before deciding the data needed for the planning action and process of the data turn, it sends the data capacity needed for them to a file capacity computer before judging whether or not the data can be contained in file empty capacity. If so, the file capacity computer signals to a controller, The controller in turn reads necessary data out of a data file server before storing them in a workstation file and at the same time, starts a planning program before executing process necessary for the planning, and stores results in the workstation file.

It should be noted that the planner model mentioned above is an action model of the planner that has a function to decide contents of the planning to be made by the planner and contents of the data needed for them.

Whenever receiving the planning input, an input observer signals to a controlling section (analysis and planning controller), which will be described later, indicating a condition the planner is in the planner model and at the same time, has functions of storing and accumulating the input of the planner. A planner model corrector is started at a predetermined moment, quantitatively arranges relations among the actions of the planner on the basis of information given by the input observer, and corrects the planner model.

The foregoing and other objects, advantages, manner of operation and novel features of the present invention will be understood from the following detailed description when read in connection with the accompanying drawings.

BRIEF DESCRIPTION OF THE DRAWINGS

Other objects and advantages of the present invention will further become apparent thereinafter and in the drawings in which:

FIG. 10 is an example of accumulation in a memory of the planner model 52.

FIG. 13 is an example of the action history.

FIG. 14 is an example of the characteristic file (2) 1404.

FIG. 15 which shows a hardware configuration for a conventional planning support system.

FIGS. 16(a) and 16(b) are software configurations for use in the host computer 1 and the workstation 3 in the conventional planning support system.

DETAILED DESCRIPTION OF THE PREFERRED EMBODIMENTS

Figure 2:
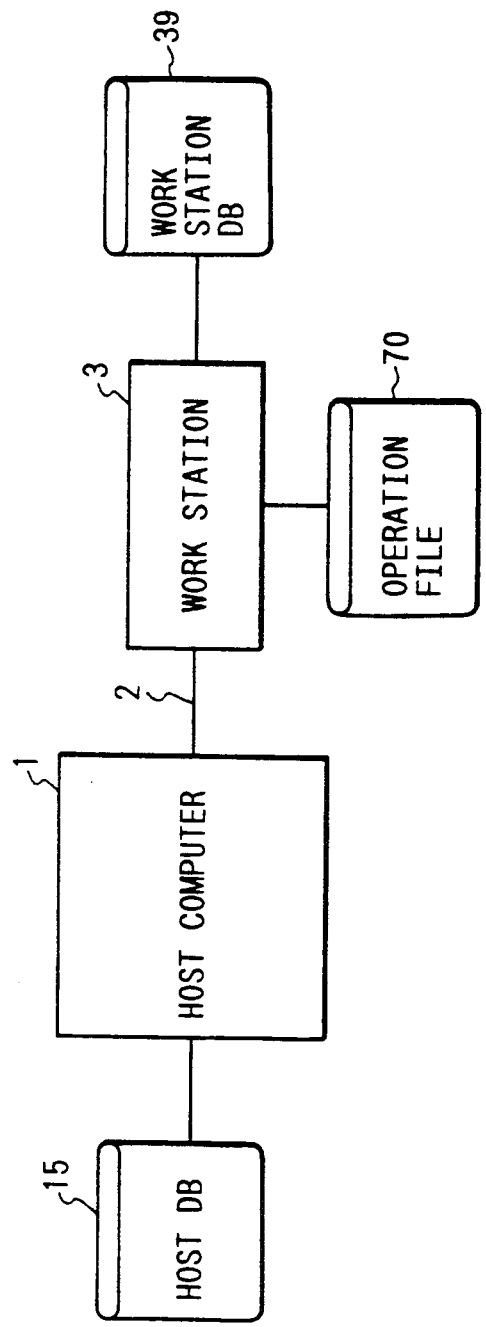
FIG. 2 is an example of hardware configuration for the embodiment.

The present invention is illustrated with an embodiment thereof in further detail by reference to the accompanying drawings. FIG. 2 is an example of hardware configuration for the embodiment. The hardware configuration in the figure is almost the same as that of FIG. 15 except that the workstation 3 has an operation file 70 therein in addition to the workstation DB 39.

Figure 1:
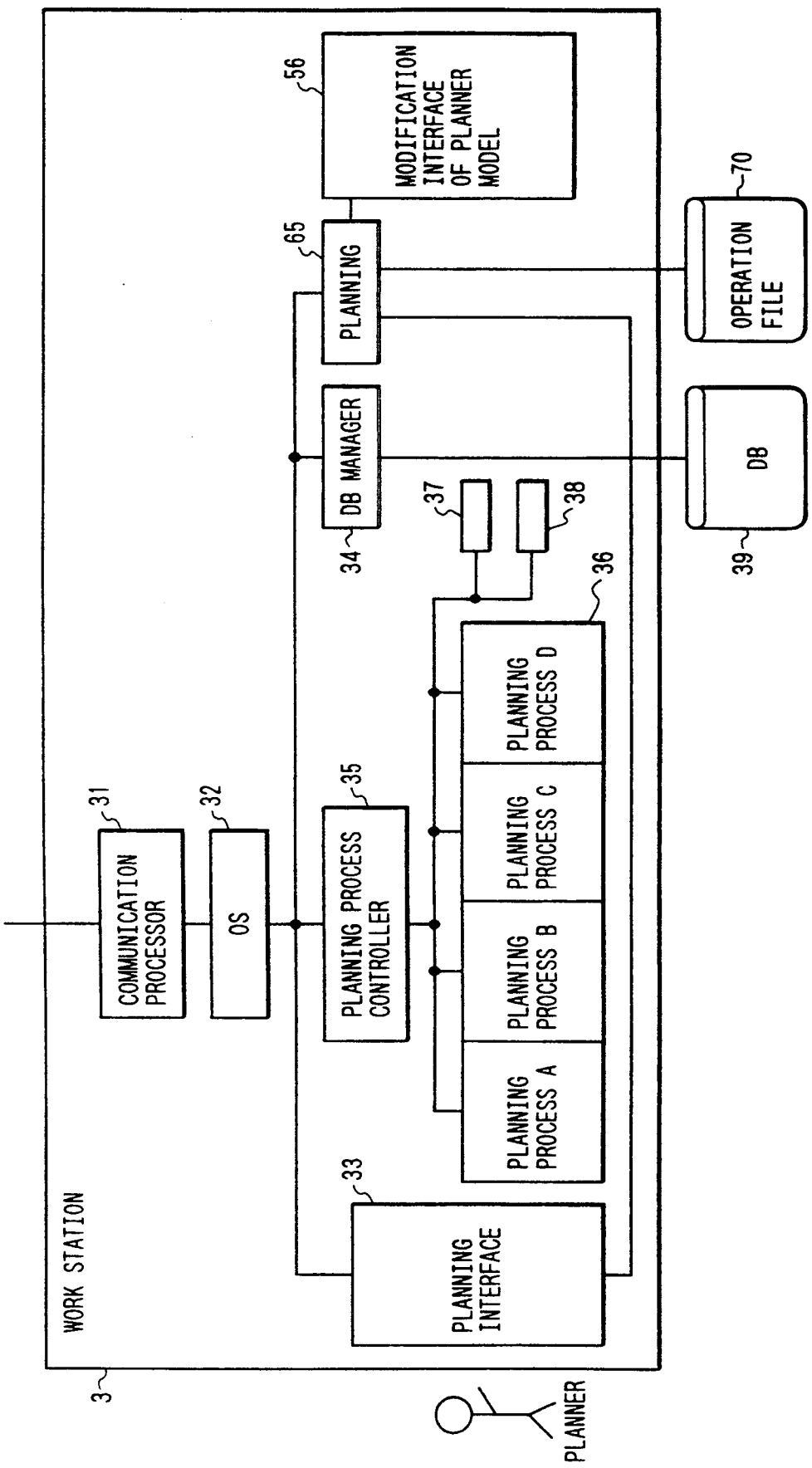
FIG. 1 an example of software configuration for use in the workstation 3 in an embodiment of the present invention.

FIG. 1 is an example of software configuration for use in the workstation 3 in the embodiment. The software configuration in the figure is almost same as that of the prior art given in FIG. 16(b) except that the former has a planning 65 and a modification interface 56 of planner model therein. A software configuration in the host computer 1 in the embodiment is same as the prior art given in FIG. 16(a).

Figure 3:
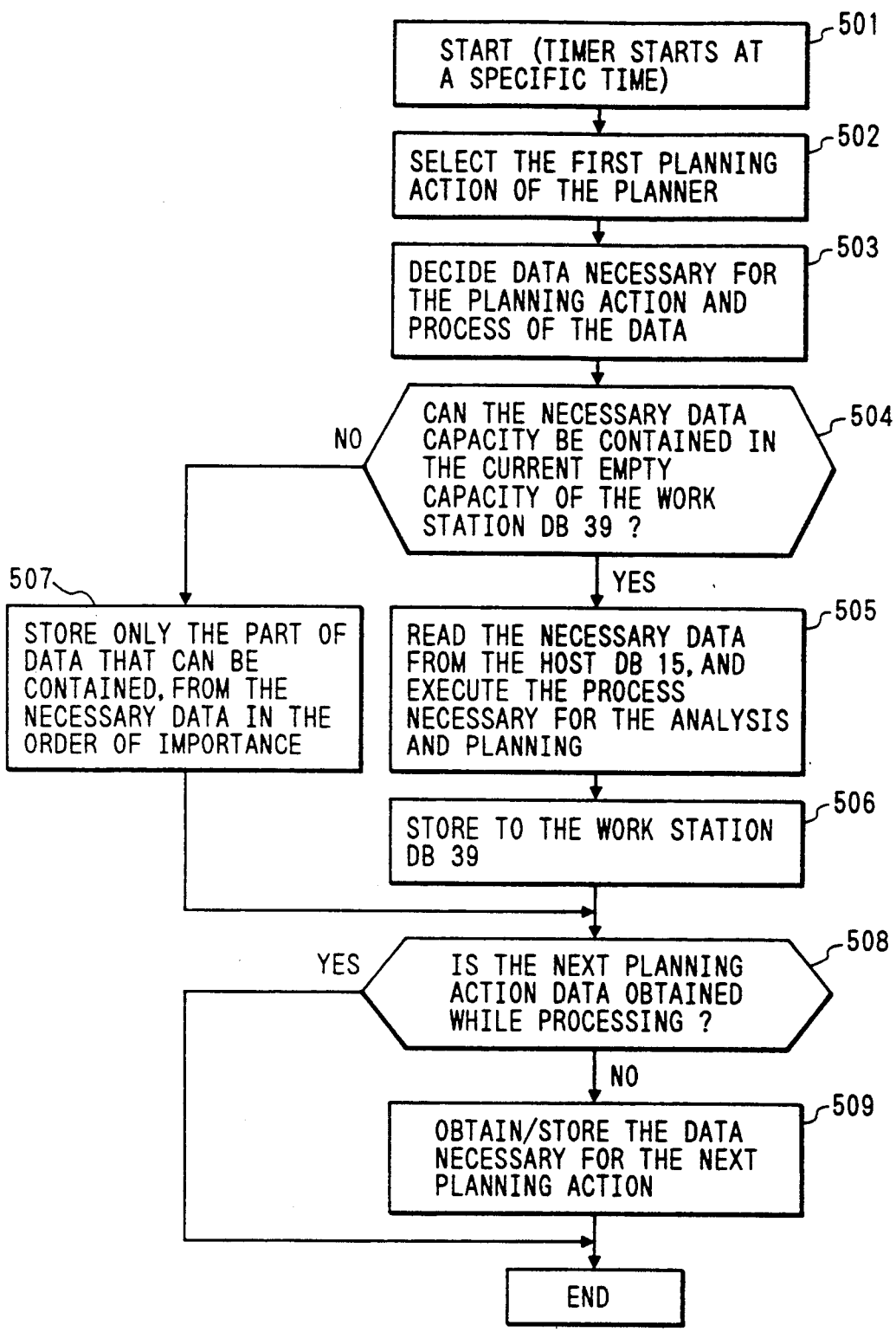
FIG. 3 is a flow of process in the workstation 3 before the planner executes his or her planning in the embodiment.

First, the following describes the flow of process in the workstation 3 by reference to FIG. 3 before the planner executes his or her planning.

Step 501: A timer (not shown) in the planning 65 starts process at a predetermined moment.

Step 502: The planning 65 looks at a planner's model stored in the operation file 70 before selecting a first planning action of the planner. The planner's model has a flow of planning action of the planner, data needed for the planning actions, time needed for acquisition of the data, and contents of the planning actions described therein.

Step 503: In turn, a decision is made on the data needed for the planning actions and contents of the data to be processed.

Step 504: Judgment is made whether or not the data needed can be contained in a current empty capacity of the workstation DB 39.

Steps 505 and 506: If the data can be contained, the data needed is read out of the host DB 15 before being stored in the workstation DB 39 and at the same time, the process needed for the planning is executed before being stored in the workstation DB 39. The process is made on the basis of the data put in advance and the process steps in the very same way as the entry procedures of the planner.

Step 507: If the data cannot be contained in the current empty capacity in step 504 above, storing is made of only parts of the data needed that can be contained in the order of importance.

Step 508: In turn, judgment is made as to whether or not the data for the next planning action, for example, called the planning action B, can be acquired, while the planner is doing the planning action processed before, for example, called the planning action A.

Step 509: If the acquiring time of the data for the planning action B is too long to acquire the data for the planning action B while the planning action A is being made, then the data needed for the planning B is stored in the workstation DB 39 in advance as with the planning action A.

Figure 4:
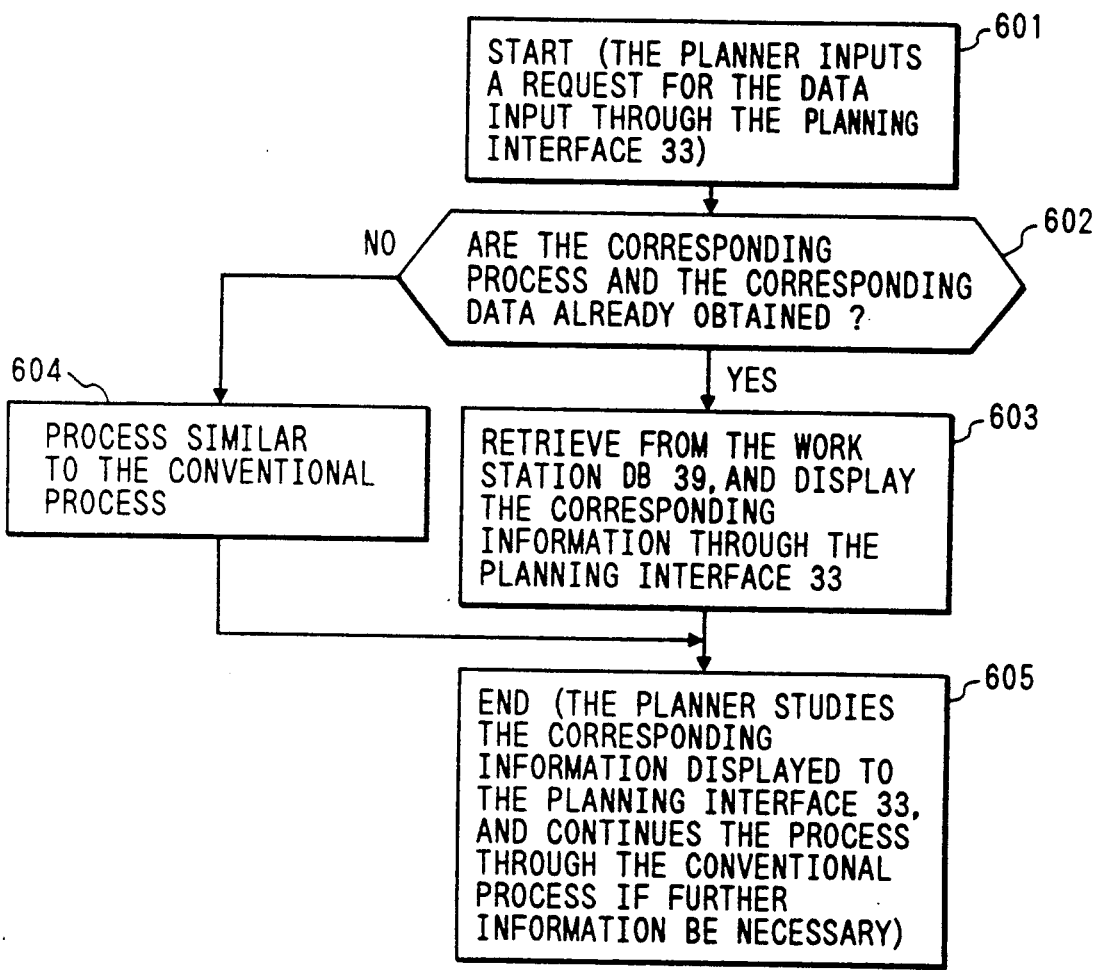
FIG. 4 is a flow of process when the planner executes his or her planning in the embodiment.

Second, the following describes the flow of process for the planning made by the planner by reference to FIG. 4.

Step 601: The planner enters a data input request through the planning interface 33 before starting the planning work.

Step 602: The planning 65 reads the operation file 70 to judge whether or not the process concerned has been done or the data concerned has been acquired when it receives the data input request.

Step 603: If so, the workstation DB 39 is retrieved and displays the information (data or processed data) concerned through the planning interface 33.

Step 604: If not, the process similar to the conventional one is made.

Step 605: The planner studies the information displayed to the planning interface 33, and continues the process through the conventional process if further information is needed.

With the embodiment described above, the user can smoothly perform the planning as it is not needed for him or her to wait for acquiring the data he or she needs.

Figure 5:
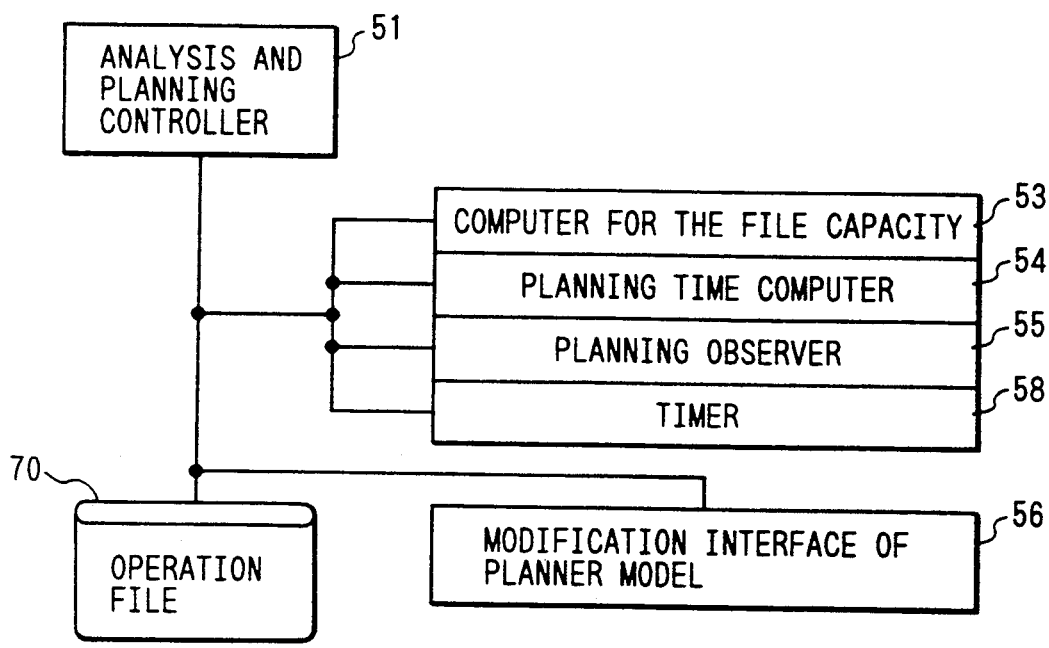
FIG. 5 is an example of configuration of the planning 65.
Figure 6:
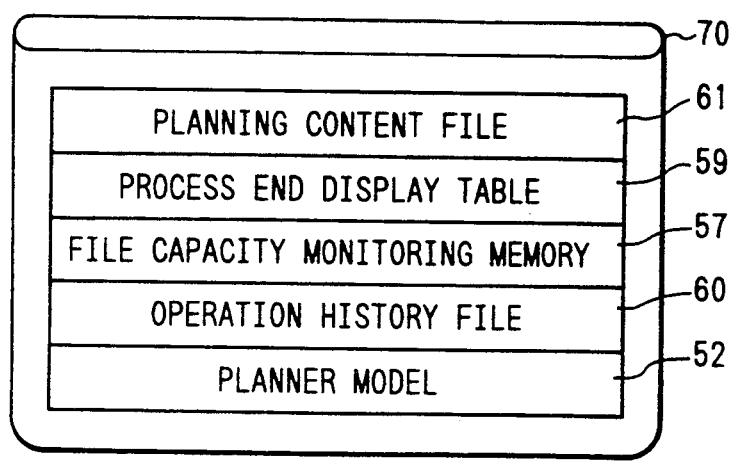
FIG. 6 is an example of configuration of the operation file 70.

In turn, the following describes the planning 65 in detail. FIG. 5 is an example of configuration of the planning 65. In the figure are indicated an analysis and planning controller 51, a computer 53 for file capacity, a planning time computer 54, a planning observer 55, and a timer 58. FIG. 6 is an example of configuration of the operation file 70. In the figure are indicated a file capacity monitoring memory 57, a planning contents file 61, an operation history file 60, a planner model 52, and an end-of-process display table 59.

Figure 7:
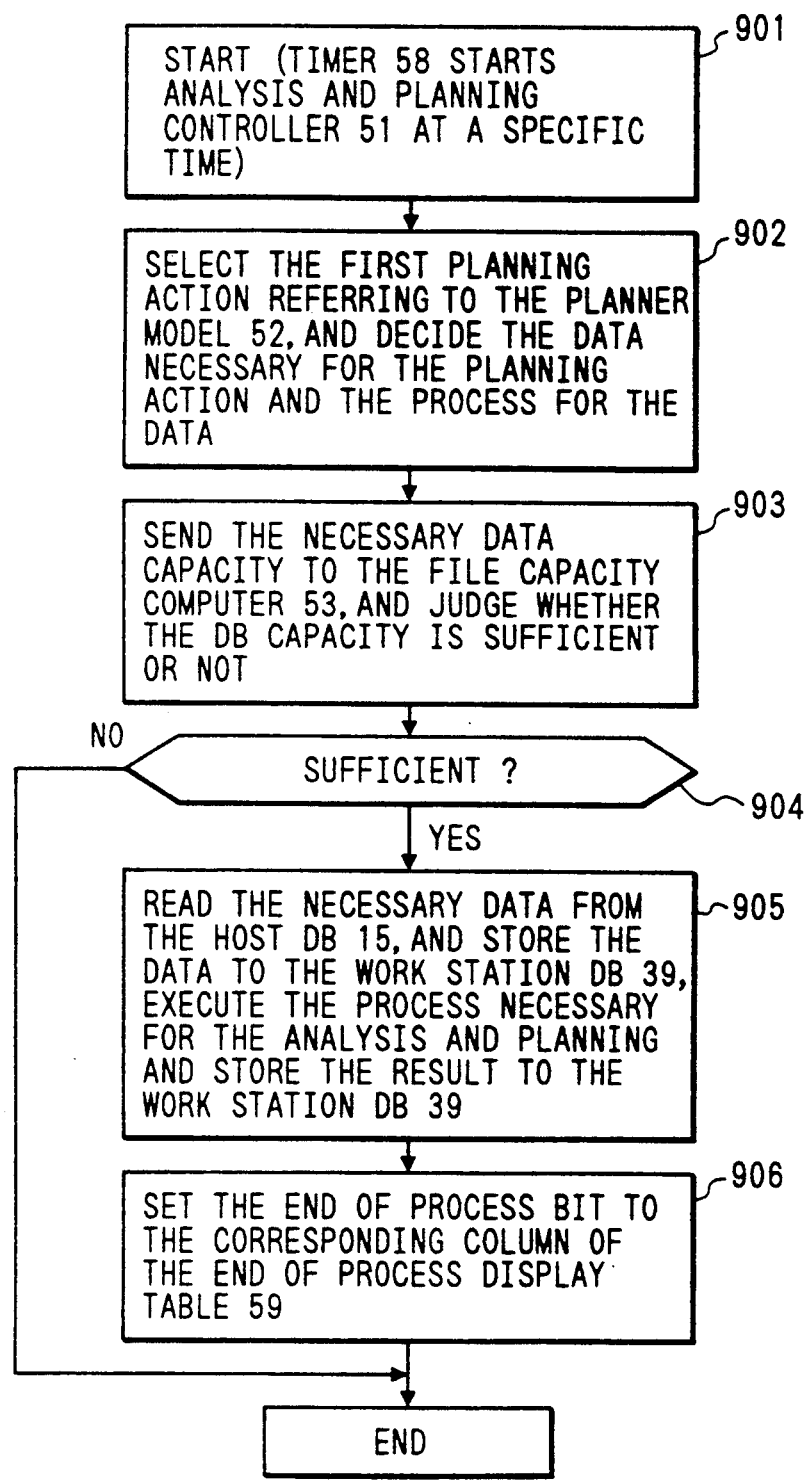
FIG. 7 is a flow of process before the planner starts his or her planning in the embodiment.

First, the following describes the flow of process by reference to FIG. 7 before the planner starts his or her planning.

Step 901: The timer 58 starts the analysis and planning controller 51 at a predetermined moment.

Step 902: The analysis and planning controller 51 refers to the planner model 52 in the operation file 70 when receiving the input from the timer 58, selects the first planning action of the planner, and decides the data needed for the planning action and contents of the data to be processed. The planner model 52 has the flow of the planning action of the planner, the data needed for the planning action, the time needed for acquiring the data, and the contents of the planning action stored therein.

Steps 903 and 904: In turn, the analysis and planning controller 51 sends the data capacity needed to the computer 53 for file capacity before the computer 53 for file capacity judges whether or not the data can be contained in the current file empty capacity. The computer 53 for file capacity can judge in terms of the data capacities sent from the file capacity monitoring memory 57 and analysis and planning controller 51 whether the DB capacity is sufficient or not. The file capacity monitoring memory 57 has the empty capacity of the DB at the time. If so, the computer 53 for file capacity sends a signal of sufficiency to the analysis and planning controller 51.

Step 905: The analysis and planning controller 51 reads the data needed out of the host DB 15 before storing them in the workstation DB 39 and at the same time, executes the process needed for the planning and stores the results in the workstation DB 39. In the process, the planning contents file 61 of the operation file 70 is referred to and reads out the data needed and the process steps. These are sent to the planning process controller 35 before processed in the very same way as the entry procedures of the planner.

Step 906: The end of process bit is set to the corresponding column of the end-of-process display table 59. The DB manager 34 controls and monitors the data storing into the workstation DB 39 to know of the empty capacity at the time, and stores it in the file capacity monitoring memory 57 through the analysis and planning controller 51.

In turn, when the planner starts the planning work, he or she enters the data input request through the planning interface 33. The planning process controller 35 refers the end-of-process display table 59 to judge whether or not the process concerned has been done or the data concerned has been acquired when it receives the data input request. If so, the workstation DB 39 is retrieved and displays the information (data or processed data) concerned through the planning interface 33. If not, the process similar to the conventional one is made. If the planner ends the process, the planning interface 33 sends it the analysis and planning controller 51. The analysis and planning controller 51 sends a data delete command about the planning process to the DB manager 34.

On the other hand, when receiving the next input from the planner, the planning interface 33 sends it to the planning observer 55. The planning observer 55 stores it in the operation history file 60 and at the same time, sends it to the analysis and planning controller 51. When receiving the signal from the planning observer 55, the analysis and planning controller 51 refers to the planner model 52 before selecting the next planning action of the planner.

Figure 8:
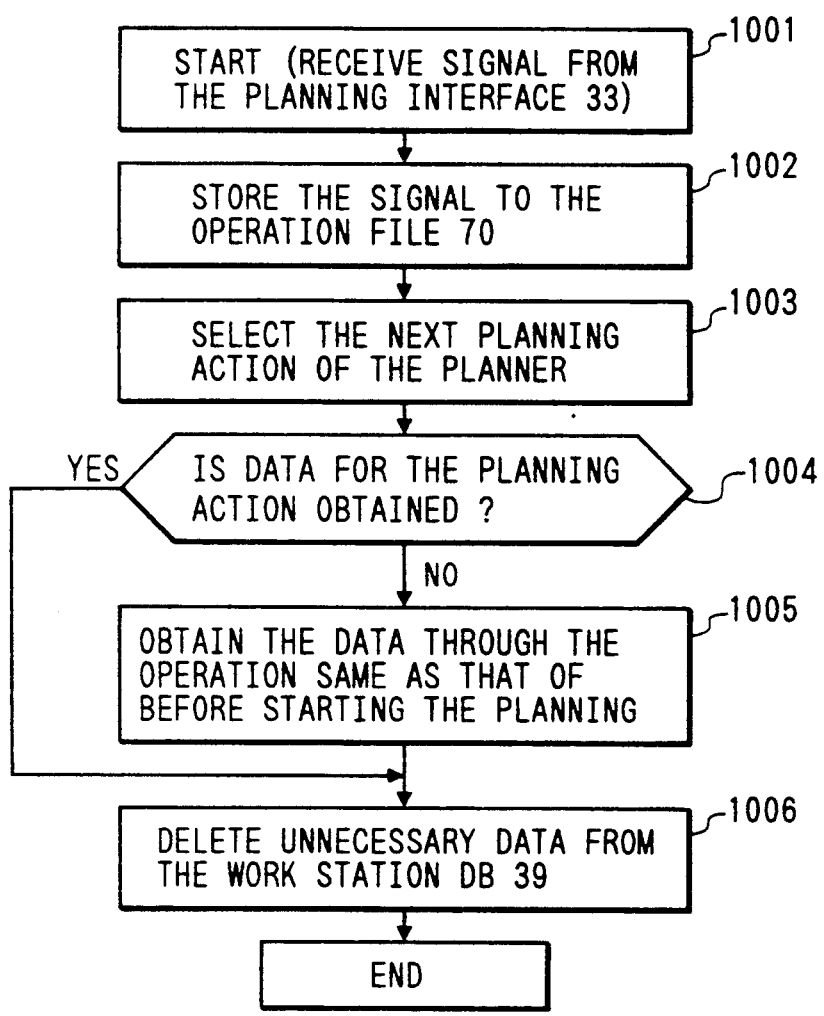
FIG. 8 is a flow of process in the planning 65 when signal is received from the planning interface 33 in the embodiment.

In turn, the following describes the flow of process in the planning 65 by reference to FIG. 8 after the planner starts his or her planning process.

Step 1002: When receiving a signal from the planner, planning interface 33 sends it to the planning 65. The planning 65 stores it in the operation file 70.

Step 1003: At the same time, the planning 65 selects the next planning action of the planner.

Step 1004: Judgment is made whether or not the data for the planning action has been already acquired by reading the operation file 70.

Step 1005: If not, the data are acquired in the same steps as before the planning starts.

Step 1006: In this case, the planning block 65 judges whether "The data that have become unnecessary as the planner took an action different from the planning model" by reading the operation file 70, and deletes the data from the workstation DB 39.

Figure 9:
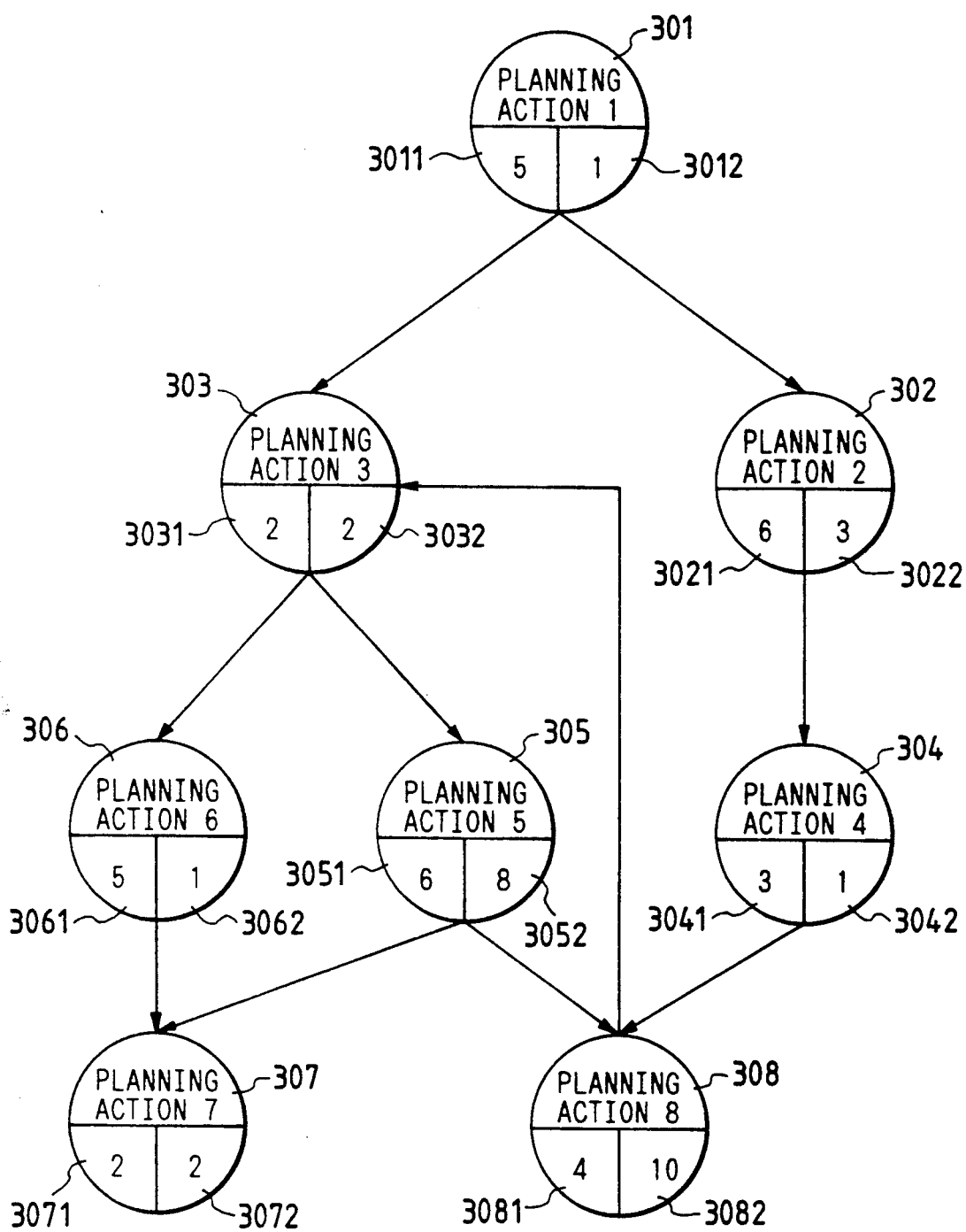
FIG. 9 is an example of configuration of the planner model 52.

FIG. 9 is an example of configuration of the planner model 52. In the figure are indicated planning actions 301 to 308, time 3011 needed for storing in the DB the data needed for the starting action, time 3012 needed for the planner to end the starting action. Similarly, the other planning actions have their respective periods of time numbered therewith.

FIG. 10 is an example of accumulation in a memory of the planner model 52. In the figure are denoted node name 1201, destination node name 1202, weight per each destination 1203, necessary storing time 1204, and processing time 1205. Note that the weight per each destination 1203 indicates importance of the data. If the DB has capacity insufficient to store data in advance, for example, data having higher weight are stored at a higher priority.

In order to make the planner proceed with the planning work, the acquiring time of data has to be made least. In other words, it is preferable that necessary data are always stored in the workstation DB 39. It is however difficult to store all the data needed for the planning in the workstation DB 39 as the capacity of the workstation DB 39 is limited. The analysis and planning controller 51 therefore selects in the planning action in the planner model 52 such a planning action that "Data are not in the workstation DB 39, when the corresponding action works, unless necessary data is stored in the workstation DB 39 before the end of current action". That is, the analysis and planning controller 51 selects all the actions whose time before starting is shorter than the time needed to end the current action. In FIG. 9, for example, data acquisition has to be started at the time of start of the planning action 301, as the data acquisition time of 6 minutes of the planning action 305 is longer than a sum of the required end time of 1 minute of the planning action 301 and the end time of 2 minutes of the planning action 303. For this, the analysis and planning controller 51 makes control so that the data acquisition should be started at the time of start of the planning action 301.

The analysis and planning controller 51 extracts the data needed for the selected planning action and their process. In turn, it sends the needed data capacity to the computer 53 for file capacity before judging whether or not the data can be contained in the current file empty capacity. If so, the computer 53 for file capacity sends a signal to the analysis and planning controller 51. The analysis and planning controller 51 then reads the needed data out of the host DB 15 before storing them in the workstation DB 39. At the same time, the analysis and planning controller 51 reads contents of the planning process out of the planning contents file 61 before starting the planning processes 36 concerned to execute the process needed for the planning. It stores results in the workstation DB 39. It also sets a bit of process end in the corresponding column of the end-of-process display table 59.

In the example of the configuration described above, if the planner action 1 is possibly succeeded by a plurality of planning actions (planning actions 2 and 3 here), the plurality of planning actions are checked to prepare for the data acquisition. Instead, it can be configured that the planning actions having less possibility can be removed out of the data preparation on the basis of actual planning action pattern, thereby shortening the data acquisition selection time and the data acquisition time. It also can be configured, as to whether the possibility of the planning actions is high or low, on the basis of a transition probability obtained in terms of number of incidences of the actual planning actions. If there are a plurality of planning actions to follow possibly, for example, the data acquisition time is determined by selecting a planning action having higher transition probability.

Figure 11:
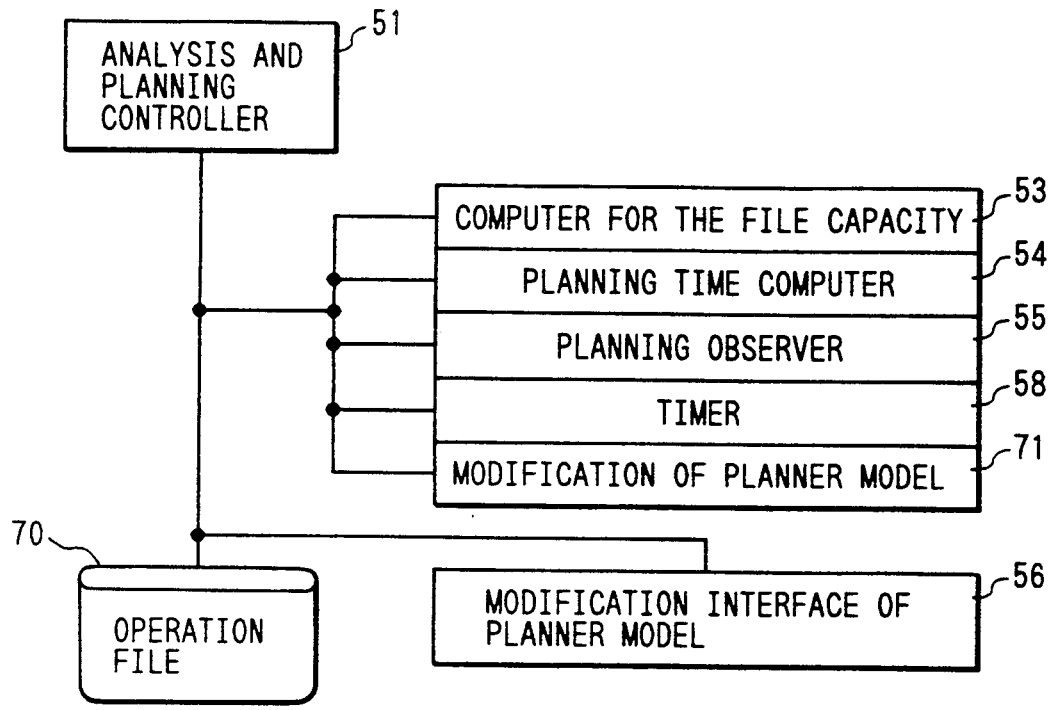
FIG. 11 is an example of configuration of the planning 65.

FIG. 11 is an example of configuration of the planning 65. In the figure are indicated an analysis and planning controller 51, a computer 53 for file capacity, a planning time computer 54, a planning observer 55, a timer 58, and a planner model corrector 71. The following describes the flow of process in the planning 65 after the planner started planning process. The data operation process of the planning 65 is same as described previously.

When receiving input from the planner, the planning interface 33 sends it to the planning 65. The planning 65 then stores it in a corresponding portion of the operation history file 60. After the process of the planner ends, the planning 65 starts the planner model corrector 71.

Figure 12:
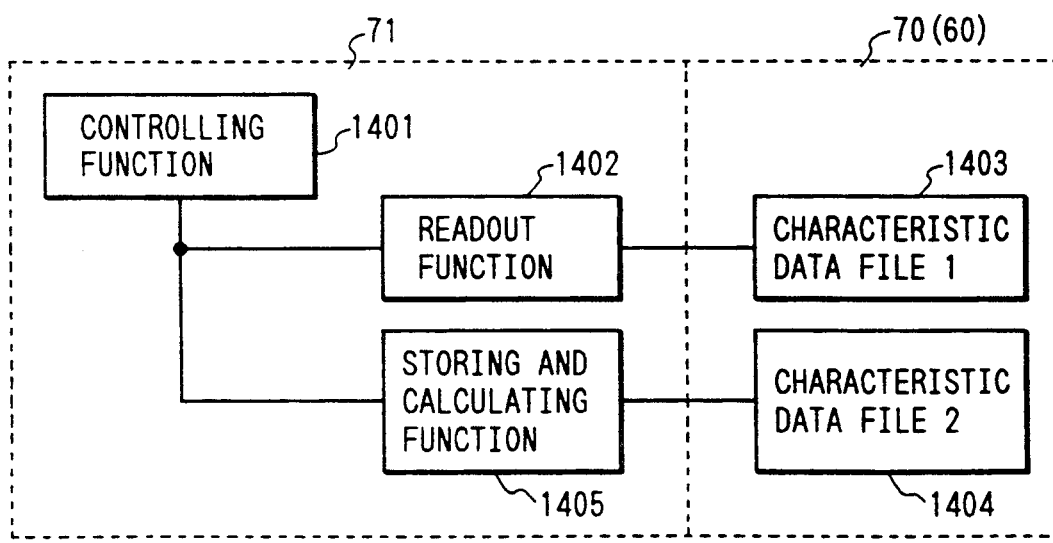
FIG. 12 is an example of configuration of the planner model corrector 71 and the operation history file 60.

FIG. 12 is an example of configuration of the planner model corrector 71 and the operation history file 60. In the figure are indicated a controlling function 1401, a readout function 1402, characteristic data file (1) 1403, a characteristic data file (2) 1404, and a storing and calculating function 1405. FIGS. 13 and 14 shows examples of the two characteristic data files 1403 and 1404, respectively.

When the planner model corrector 71 is started, first the controlling function 1401 reads the characteristic data file (1) 1403 with use of the readout function 1402 to know of the action history of the planner so far. FIG. 13 is an example of the action history. FIG. 13 is the characteristic data file (1) for the planner model 52 (not shown) other than FIG. 9 for simplicity of description.

In FIG. 13, the planning action 1 occurred 10 times among the first 12 actions of the planner. For the planning action 1, as an example, four of the 10 planning actions occurred are followed by the planning action 2, and six are followed by the planning action 3.

The controlling function 1401 sends the data to the storing and calculating function 1405. The storing and calculating function 1405 then calculates transition probability between the actions on the basis of the data before storing results in the characteristic file (2) 1404. Of the first 12 actions of the planner, for example, the planning action 1 occurred 10 times. Occurrence probability of the planning action 1 was 0.83. The transition probability of the planning action 1 to the planning action 2 was 0.4, as four of the 10 planning actions occurred are followed by the planning action 2. As such, the storing and calculating function 1405 calculates the transition probability on the basis of the data (FIG. 13) before storing results in the characteristic file (2) 1404. FIG. 14 is an example of the characteristic file (2) 1404. Contents of the characteristic file (2) 1404 are same as in FIG. 10. The figure also shows the transition probability as probability per each route 1604 for each planning action.

The embodiment described above has the advantage that can achieve that the user can put a specifically suitable planner model suitable to his or her specific process characteristics. Thus, he or she can smoothly make planning with use of his or her personality.

While the principles of the present invention have been described above in connection with specific embodiments, and particular modifications thereof, it is to be clearly understood that this description is made only by way of example and not as limitation on the scope of the present invention.

As described in detail so far, the present invention provides a prominent effect of accomplishing the planning support system that the data supply time to the user can be adjusted at a pace of his or her working process depending on the process situation of the planning work complying with his or her process characteristics.

What is claimed is:

1. A planning support system comprising:
   a workstation having an operator interface, planning processing means, a data file server, and memory means therein;
   a host computer;
   a communication line connecting the workstation and the host computer;
   a planner model comprising data indicating (i) each of a plurality of planning actions stored in the data file server, (ii) permitted flow sequencing among the planning actions, (iii) a processing time for each of planning actions, and (iv) a start-up time necessary for assembling the data needed to process each of the planning action;
   the planning processing means including a means for performing a procedure for minimizing expected processing time of said planner model, in processing a planning action in said planner model, based upon a planning request input through the operator interface;
   means for determining a first planning action to be executed, and determining, based upon said planner model and said procedure, a second planning action to be executed following the first planning action; and
   means for storing the data needed to process the second planning action into the memory means before processing of the second planning action is started on the basis of the permitted flow sequencing from the planner model.

2. A planning support system comprising:
   a work station having (i) a memory, (ii) a processing means for sequentially processing each of a plurality of planning action processing procedures, (iii) an operator interface for receiving, after the processing means finishes processing a selected one of the planning action processing procedure, an operator selection of a next planning action processing procedure to be processed by the processing means, and (iv) a file server for at least storing (1) planning model data indicative of each of the plurality of planning action processing procedures, (2) flow path data which describes which of the plurality of planning action processing procedures are permitted to follow each of the planning action processing procedures, (3) start-up time data for each of the planning action processing produces indicating a start-up time needed to acquire data for performing the each planning action processing procedure, and (4) processing time data for each of the planning action processing procedures indicating a processing time need to perform the each planning action processing procedure;
   a host computer for providing the data for performing the planning action processing procedures;
   a communication line connected between the host computer and the workstation for carrying the data needed for the processing means to process subsequent planning action processing procedures from the host computer to the workstation;
   a process planning means for minimizing an expected processing time of the sequentially selected series of the planning action processing procedures, the process planning means including: (i) a means for determining a currently processing one of the planning action processing procedures which is currently being processed by the processing means, (ii) a means for determining from the flow path data potentially subsequent ones of the planning action processing procedures which are permitted to follow the currently processing planning action procedure, (iii) a means for acquiring and storing in the workstation memory data for performing at least one of the potentially subsequent planning action processing procedures during processing of the currently processing planning action processing procedure such that, if the at least one potentially subsequent planning action processing procedures is selected at the operator interface as a next selected planning action processing procedure, the start-up time for the next selected planning action processing procedure is reduced or eliminated.

3. The planning support system according to claim 1, further comprising: file capacity monitoring means;
   file capacity calculating means; and,
   means for storing the data needed to process the second planning action in an order of priority based upon a probability derived from a history of executed planning actions, into empty areas of the workstation memory means monitored by the file capacity monitoring means when the file calculating means calculates that a usable capacity of the empty areas of the workstation memory means is smaller than a volume of the data needed to perform the second planning action.

4. The planning support system according to claim 1, wherein said start-up time necessary for starting the planning action in said planner model is a time needed for acquiring the data needed to perform the planning action.

5. The planning support system according to claim 1, further comprising:
input observing means for observing a planning request input through the operator interface, and said expected processing time minimizing procedure is responsive to the planning request input observed by the input observing means.

6. The planning support system according to claim 5, further comprising correcting means for correcting the expected processing time minimizing procedure, such that the expected processing time minimizing procedure is corrected by the correcting means on the basis of the planning request input observed by the input observing means.

7. The planning support system according to claim 1, wherein a plurality of the procedures, each corresponding to one of a plurality of planning models are designated, said first and second planning actions of each procedure are determined based upon the corresponding planning model, and the data needed for the second planning action of each procedure has different priorities given to each procedure.

8. The planning support system according to claim 7, wherein data in the data file server are provided with an order of priority decided based upon probability derived from a history of executed planning actions.

9. A planning support method implemented in a system including a host computer, a workstation having an operator interface, planning process means, a data file server, and memory means therein, and a communication line connecting the workstation and the host computer, the method comprising:
a step of storing a planner model comprising planning action data indicating each of a plurality of planning actions stored in the data file server and flow path data indicating permitted flow paths among the planning actions, the planning action data further indicating a process time of a corresponding planning action and a start-up time necessary for acquiring the planning data to start processing the corresponding planning action;
a step of minimizing expected processing time of a processed plurality of planning actions of said planar model, based upon planning requests input through the operator interface;
a step of determining a first planning action to be processed, and determining a second planning action to be processed following the first planning action, in accordance with the minimizing step, said planner model flow path data, and the first planning action;
a step of acquiring the data from the host computer through the communication line needed for processing the second planning action; and,
a step of storing the acquired data into the memory means before the second planning action is started based on the respective process times and start-up times of the planner model stored in the file server.

* * * * *

UNITED STATES PATENT AND TRADEMARK OFFICE
CERTIFICATE OF CORRECTION

PATENT NO. : 5,331,545
DATED : July 19, 1994
INVENTOR(S) : Hiroshi Yajima, et al.

It is certified that error appears in the above-indentified patent and that said Letters Patent is hereby corrected as shown below:

Claim 9, column 12, lines 17-18, delete "planar" and substitute therefor --planner--.

Signed and Sealed this

Thirteenth Day of September, 1994

Attest:

BRUCE LEHMAN

Attesting Officer

Commissioner of Patents and Trademarks